United States Patent [15] 3,639,279
Gardner et al. [45] Feb. 1, 1972

[54] SCALE REMOVAL COMPOSITION AND METHOD USING SALT OF DIGLYCOLIC ACID AND BASE AT PH ABOVE 5

[72] Inventors: Tommy R. Gardner; Reginald M. Lasater; John A. Knox, all of Duncan, Okla.

[73] Assignee: Halliburton Company, Duncan, Okla.

[22] Filed: Apr. 1, 1969

[21] Appl. No.: 812,436

[52] U.S. Cl..................252/86, 21/2.7, 106/14, 134/3, 134/41, 252/8.55, 252/82, 252/146, 252/180
[51] Int. Cl..................C02b 5/06, C23f 13/00, C23g 1/18
[58] Field of Search..................252/82, 86, 146, 175, 180, 252/388, 8.55; 21/2.7; 106/14; 134/3, 41; 260/484

[56] References Cited

UNITED STATES PATENTS 3,070,464   12/1962   Levy..................................134/41
3,118,793   1/1964    Maloney...........................134/41 X
3,130,153   4/1964    Keller.................................134/41 X
3,150,081   9/1964    Haslam..............................134/41 X
3,463,730   8/1969    Booth.................................252/86 X Primary Examiner—John T. Goolkasian
Assistant Examiner—M. E. McCamish
Attorney—Dunlap, Laney, Hessin and Dougherty

[57] ABSTRACT

Methods and compositions for removing scale from surfaces, particularly from subsurface and surface equipment associated with oil and gas wells, and industrial equipment such as heat exchangers, condensers, boilers and the like. The scale to be removed is dissolved in aqueous basic solutions of diglycolic acid salts, mixtures of diglycolic acid salts and hydroxy acid salts, and mixtures of diglycolic acid salts and substituted acid salts of diamines or tertiary amines.

40 Claims, No Drawings 3,639,279

SCALE REMOVAL COMPOSITION AND METHOD USING SALT OF DIGLYCOLIC ACID AND BASE AT PH ABOVE 5

BACKGROUND OF THE INVENTION

1. Field of the Invention

The present invention relates generally to methods and compositions for removing scale from surfaces, and more particularly, but not by way of limitation, to methods of removing scale deposits from surfaces with compositions comprised of aqueous basic solutions of diglycolic acid salts, mixtures of diglycolic acid salts and hydroxy acid salts, and mixtures of diglycolic acid salts and substituted acid salts of diamines or tertiary amines.

2. Description of the Prior Art

Scale accumulation or deposits in oil field and industrial equipment has long been a source of trouble and operating expense. These deposits generally result from precipitation of dissolved salts from water or brine passing through the equipment. The most common of the precipitates are alkaline earth metal carbonates and sulfates which form deposits on exposed surfaces within the equipment. In oil and gas wells such deposits accumulate in the producing formation and in the well equipment such as tubing, chokes, flow lines, separators, emulsion treaters, etc. The deposits adhere tightly to the formations and equipment and as additional deposits accumulate, the flow of fluid through the formations and equipment is impeded.

Alkaline earth metal sulfates and carbonates such as calcium sulfate (anhydrite and gypsum), calcium carbonate and composites thereof are commonly encountered in oil field and industrial equipment. The removal of the carbonates is normally not a major problem since carbonate scale or deposits will readily dissolve in a variety of solutions. However, sulfates, particularly calcium sulfate deposits in the form of gypsum, are not easily removed in that they have a relatively low solubility in most solutions. Calcium sulfate often forms in wells because of the intermixing of two produced brines, one high in calcium ions and the other high in sulfate ions, whereby the solubility is exceeded and a calcium sulfate (gypsum or anhydrite) precipitate is formed. Changes in pressure and temperature conditions within the well equipment also contribute to the precipitation of calcium sulfate from brines.

Many methods and compositions have been developed for the removal of sulfate and carbonate scale from surfaces. One such method involves reacting the scale with a solution containing carbonate to effect the conversion of sulfate in the scale to carbonate which can then be dissolved with acid solutions. Another method has been to react sodium hydroxide or potassium hydroxide solutions with the scale to form a sludge or precipitate of alkaline earth metal hydroxide which can then be removed by flushing with water or dissolving with acid. While these and other methods are effective, they require reacting the scale with a first solution to form a product insoluble in that solution, and then removing the insoluble product with a second solution or material, either by dissolution of the insoluble product or by flushing. Consequently, considerable time and expense is required to carry out these prior methods.

SUMMARY OF THE INVENTION

The present invention relates to compositions for removing gypsum and anhydrite scales from surfaces without the formation of insoluble precipitates, said composition comprising an aqueous solution of a diglycolic acid and a base, said base being present in an amount sufficient to form the salt of said acid and to adjust the pH of said solution to above about pH 5 and the method of its use. The composition may be formed by combining an aqueous solution of the salt of a diglycolic acid and sufficient base to adjust the pH to above about pH 5.

It is, therefore, a general object of the present invention to provide methods and compositions for removing scale from surfaces.

A further object of the present invention is to provide methods and compositions for removing scale deposits from surfaces in oil and gas well formations and in oil field and industrial equipment wherein said scale may be completely removed and dissolved in a single composition without the formation of water insoluble products.

Still a further object of the present invention is the provision of methods and compositions for removing scale from surfaces wherein the scale may be removed in a single treatment which is relatively inexpensive to carry out.

These and other objects and advantages of the invention will be apparent from a more detailed description which follows.

DESCRIPTION OF THE PREFERRED EMBODIMENTS

It has been discovered that an aqueous solution of a salt of diglycolic acid and a base, said base being present in an amount sufficient to adjust the pH of said solution to about pH 6 or greater, provides a composition having superior properties for the dissolution and removal of scale on surfaces, particularly gypsum deposits and the like. Additionally, it has been discovered that aqueous solutions of a salt of diglycolic acid, a salt of hydroxy acid and a base, said base being present in an amount sufficient to adjust the pH of said solution to about pH 6 or greater, provide compositions having superior properties for the dissolution and removal of scale from surfaces. Furthermore, it has been discovered that aqueous solutions of a salt of diglycolic acid, a salt of substituted acid of a diamine or a tertiary amine and a base, said base being present in an amount sufficient to adjust the pH of said solution to about pH 6 or greater, provide compositions having superior properties for the dissolution and removal of scale from surfaces.

It has been found that scale such as sulfates and carbonates commonly found in oil field and industrial equipment will readily be dissolved by the compositions of the present invention without the formation of water insoluble precipitates. Thus, the compositions of the present invention may be used for removal of sulfates, carbonates and other scale by dissolving the scale therein in a single treatment.

A preferred composition of the present invention is comprised of an aqueous solution of diglycolic acid present in an amount of from about 1 percent to about 70 percent by weight, and a base present in an amount sufficient to convert the diglycolic acid to a salt and to adjust the solution to a pH of from about 6 to about 14.

Another preferred composition of the present invention is comprised of an aqueous solution of diglycolic acid present in an amount of from about 0.5 percent to about 50 percent, by weight, a hydroxy acid present in an amount of from about 0.5 percent to about 50 percent by weight, and a base present in an amount sufficient to convert the diglycolic and hydroxy acids to salts and to adjust the pH of the solution to from about 6 to about 12.

Yet another preferred composition of the present invention is comprised of an aqueous solution of diglycolic acid present in an amount of from about 0.5 percent to about 50 percent, by weight, a substituted acid of a diamine or tertiary amine present in an amount of from about 0.5 percent to about 50 percent, by weight, and a base present in an amount sufficient to convert the diglycolic acid and substituted acid of a diamine or tertiary amine to salts and to adjust the pH of the solution to from about 6 to about 12.

Examples of hydroxy acids which may be employed in the present invention are glycolic acid, malic acid and gluconic acid. Examples of substituted acids of tertiary amines or diamines which may be employed in the present invention are ethylenediaminetetraacetic acid (E.D.T.A.), diethylenetriamine-pentaacetic acid (D.T.P.A.) or nitrilotriacetic acid (N.T.A.). Examples of bases which may be employed in the present invention are ammonium hydroxide, sodium hydroxide, potassium hydroxide, and other alkali metal hydroxides.

A more specific preferred composition of the present invention is comprised of an aqueous solution of ammonium diglycolate present in an amount of about 5 percent by weight to 25 percent by weight, and ammonium hydroxide present in an amount sufficient to adjust the solution to a pH of from about 7 to about 11.

Another more specific preferred composition of the present invention is comprised of an aqueous solution of ammonium diglycolate present in an amount of from about 5 percent to about 25 percent by weight, ammonium malate present in an amount of from about 5 percent by weight to about 25 percent by weight, and ammonium hydroxide present in an amount sufficient to adjust the solution to a pH of from about 7 to about 11.

Still another more specific preferred composition of the present invention is comprised of an aqueous solution of ammonium diglycolate present in an amount of from about 5 percent by weight to about 25 percent by weight, ammonium E.D.T.A. present in an amount of from about 5 percent by weight to about 25 percent by weight and ammonium hydroxide present in an amount sufficient to adjust the solution to a pH of from about 7 to 11.

The compositions of the present invention may be prepared by first preparing a solution containing a desired base. A desired quantity of diglycolic acid, or diglycolic acid and hydroxy acid or diglycolic acid and substituted acid of a diamine or tertiary amine may then be combined with the basic solution to form the corresponding salts thereof. An excess amount of the base can then be added to the solution if necessary to adjust the solution pH to from about 6 to about 14. It has been found that the above method of preparation should be used to maintain the solution at a pH of about 5 during preparation in order to avoid the precipitation of insoluble salts. Precipitation will occur between a pH of about 0 to about 5, and in the preferred method for preparing the compositions of the present invention, the acid is added to the base water and then adding a base to the solution to adjust the pH to from about 6 to about 14. If precipitation should occur, the precipitate will go into solution as the solution pH is raised.

In practice of the invention for removal of scale it has been found that a preferred composition described above may be circulated over the surface from which the scale is to be removed or allowed to contact the scale to be removed in a static condition for a period of time sufficient for the scale to be dissolved at normal temperatures. The preferred compositions will dissolve sulfate scale (gypsum and anhydrite), carbonate scale and the like without forming water insoluble precipitates, and once the scale has been dissolved and the composition removed, no further treatment is necessary.

Laboratory tests were conducted wherein the compositions of this invention were tested as follows:

PROCEDURE

The tests shown in tables I through VI were made by placing a preweighed block of gypsum in 100 ml. (milliliter) samples of the test solutions. After remaining in static contact with the test solutions for periods of time, the blocks of gypsum were removed, rinsed with distilled water, dried at moderate heat and reweighed.

The difference in weight was then used to calculate solubility in units of pounds per gallon of solution. The test solutions were prepared by mixing the appropriate base with distilled water and then adding the desired weight of acid or acids thereby forming the desired salts. The pH of each solution was adjusted with the same basic precursor as that shown in the tables.

TABLE I.—COMPARISON OF GYPSUM SOLUBILITY IN VARIOUS ORGANIC ACID SALT SOLUTIONS

Type of test: Static
Test temperature: 75° F.
Test time: 24 hrs.

| Salt formed | Basic precursor used | Acid concentration in solution, weight percent | pH of solution | Gypsum dissolved, lbs./gal. | Comments |
| --- | --- | --- | --- | --- | --- |
| Sodium citrate | Sodium hydroxide | 20 | 12 | 0.750 | Very thick sludge formed. |
| Sodium glycolate | do | 20 | 10 | 0.063 | Precipitate formed. |
| Sodium gluconate | do | 20 | 10 | 0.304 | No precipitate. |
| Sodium lactate | do | 20 | 8 | 0.107 | Precipitate formed. |
| Sodium diglycolate | do | 20 | 10 | 0.820 | No precipitate. |
| Do | do | 10 | 10 | 0.489 | Some precipitate formed. |

From the above it may be seen that sodium diglycolate at a concentration of 20 percent in a solution having a pH of 10 effectively dissolved calcium sulfate without forming an insoluble precipitate.

TABLE II.—COMPARISON OF GYPSUM SOLUBILITY IN VARIOUS DIGLYCOLIC ACID AND GLYCOLIC ACID SALT SOLUTIONS

Type of test: Static
Test temperature: 75° F.
Test time: 24 hrs.

| Salt formed | Basic precursor used | Acid concentration in solution, weight percent | pH of solution | Gypsum dissolved, lbs./gal. | Comments |
| --- | --- | --- | --- | --- | --- |
| Ammonium diglycolate | Ammonium hydroxide | 20 | 11 | 0.725 | No precipitate. |
| Sodium diglycolate | Sodium hydroxide | 20 | 10 | 0.820 | Do. |
| Sodium glycolate | do | 20 | 10 | 0.063 | Precipitate formed. |
| Ammonium diglycolate / Ammonium glycolate | Ammonium hydroxide | 10 / 10 | 10 | 1.026 | Small trace of precipitate. |
| Ammonium diglycolate / Ammonium glycolate | do | 15 / 5 | 10 | 0.906 | Trace of precipitate. | to maintain the pH at the desired level.

The compositions of the present invention may also be prepared by adding the organic acid salts to a quantity of From the above table it can be seen that diglycolic acid salt in a solution having a pH of about 10 effectively dissolved gypsum without forming a precipitate. Also, it may be seen that a synergistic effect is achieved by a solution containing a mixture of diglycolic and glycolic acid salts having a pH of about 10 in that an increased weight of gypsum was dissolved with only a slight trace of precipitate formed.

From the above it may be seen that the compositions of the present invention are effective for dissolving gypsum over the temperature range shown.

Additional laboratory tests were conducted using compositions of the present invention as follows:

TABLE III.—COMPARISON OF GYPSUM SOLUBILITY IN DIGLYCOLIC ACID SALT SOLUTIONS OF VARYING pH

Type of test: Static
Test temperature: 75° F.
Test time: 24 hrs.

| Salt formed | Basic precursor used | Acid concentration in solution, weight percent | pH of solution | Gypsum dissolved, lbs./gal. | Comments |
|---|---|---|---|---|---|
| Sodium diglycolate | Sodium hydroxide | 20 | 6 | 0.50 | Trace of precipitate. |
| Do | do | 20 | 8 | 0.84 | Do. |
| Do | do | 20 | 10 | 0.82 | No precipitate. |

From the above it may be seen that solutions containing sodium diglycolate having a pH in the range of from 6 to 10 are effective for dissolving gypsum.

TABLE IV.—COMPARISON OF ANHYDROUS CALCIUM SULFATE SOLUBILITY IN DIGLYCOLIC ACID SALT AND GLYCOLIC ACID SALT SOLUTIONS

Type of test: Static
Test of temperature: 75° F.
Test time: 24 hrs.

| Salt formed | Basic precursor used | Acid concentration in solution, weight percent | pH of solution | Calcium sulfate dissolved, lbs./gal. | Comments |
|---|---|---|---|---|---|
| Ammonium diglycolate | Ammonium hydroxide | 1 | 10.5 | 0.1074 | No precipitate. |
| Do | do | 5 | 10.5 | 0.2970 | Do. |
| Do | do | 10 | 10.5 | 0.3606 | Do. |
| Do | do | 20 | 10.5 | 0.5728 | Do. |
| Ammonium diglycolate / Ammonium glycolate | do | 10 / 10 | 10.5 | 0.8200 | Do. |
| Potassium diglycolate | Potassium hydroxide | 20 | 12.0 | 0.7343 | Do. |

From the above table it may be seen that the compositions of the present invention are effective for dissolving anhydrous calcium sulfate without forming a precipitate.

The test solutions were prepared by mixing the base shown in the following tables with distilled water and then adding the desired weight of acid or acids thereby forming the desired TABLE V.—COMPARISON OF GYPSUM SOLUBILITY IN VARIOUS DIGLYCOLIC ACID AND HYDROXY ACID SALT SOLUTIONS Type of test: Static
Test temperature: 75° F.

| Salt formed | Basic precursor used | Acid concentration in solution, weight percent | pH of solution | Gypsum dissolved, lbs./gal. | Comments |
|---|---|---|---|---|---|
| Ammonium diglycolate / Ammonium Malate | Ammonium hydroxide | 10 / 10 | 10.5 | 0.9172 in 72 hrs | No precipitate. |
| Ammonium diglycolate / Ammonium gluconate | do | 10 / 10 | 10.7 | 0.6840 in 72 hrs | Do. |
| Ammonium malate | do | 20 | 10.5 | 1.210 in 92 hrs | Precipitate formed. |
| Sodium gluconate | Sodium hydroxide | 20 | 10.0 | 0.329 in 48 hrs | No precipitate. |
| Sodium E.D.T.A. / Sodium hydroxide | | 10 / 10 | | 0.205 in 24 hrs | Do. |
| Sodium E.D.T.A. / Sodium hydroxide | | 5 / 10 | | 0.205 in 24 hrs | Do. |

From the above it may be seen that solutions of diglycolic acid salts and hydroxy acid salts having a pH of about 10 are effective for dissolving gypsum without forming a precipitate.

PROCEDURE salts. The pH of each solution was adjusted with the same basic precursor. Twenty grams of gypsum reagent grade powder was added to 100 cc. test portions of the test solutions TABLE VI.—EFFECT OF TEMPERATURE ON SOLUBILITY OF GYPSUM IN DIGLYCOLIC ACID AND HYDROXY ACID SALTS Type of test: Static
Test time: 24 hrs.

| Salt formed | Basic precursor used | Acid concentration in solution, weight percent | pH of solution | Gypsum dissolved, lbs./gal. | | | |
|---|---|---|---|---|---|---|---|
| | | | | 100 °F. | 125 °F. | 150 °F. | 175 °F. |
| Ammonium diglycolate / Ammonium glycolate | Ammonium hydroxide | 10 / 10 | 10 | 0.590 | | 0.845 | 1.050 |
| Ammonium diglycolate / Ammonium glycolate | do | 10 / 20 | 10 | 0.608 | 0.705 | 0.885 | 1.485 |
| Ammonium diglycolate / Ammonium glycolate | do | 20 / 10 | 10 | 0.573 | | 0.915 | 1.060 |
| Ammonium diglycolate / Ammonium malate | do | 10 / 10 | 10 | 0.655 | 1.129 | 1.300 | 1.835 |
| Ammonium diglycolate / Ammonium malate | do | 10 / 20 | | | | | | and allowed to stand for the times shown. The solutions were then tested using standard laboratory methods to determine the calcium ion concentration in the solutions. The calcium ion concentrations were then converted to lbs. of gypsum dissolved per gallon of solution by standard methods.

The present invention, therefore, is well adapted to carry out the objects and obtain the ends and advantages mentioned as well as those inherent therein. The foregoing disclosure and description is illustrative and explanatory thereof and suitable variations may be made without departing from the spirit of the invention.

TABLE VII.—COMPARISON OF GYPSUM SOLUBILITY IN VARIOUS DIGLYCOLIC ACID AND GYLCOLIC ACID SALT SOLUTIONS

Type of test: Static
Test temperature: 75° F.
Test time: 24 hrs.

| Salt formed | Basic precursor used | Acid concentration in solution, weight percent | pH of solution | Gypsum dissolved, lbs./gal. |
|---|---|---|---|---|
| Ammonium diglycolate<br>Ammonium glycolate | Ammonium hydroxide | 5<br>10 | 10 | 0.675 |
| Ammonium diglycolate<br>Ammonium glycolate | ----do---- | 10<br>10 | 10 | 1.05 |
| Ammonium diglycolate<br>Ammonium glycolate | ----do---- | 15<br>10 | 10 | 1.27 |
| Ammonium diglycolate<br>Ammonium glycolate | ----do---- | 20<br>10 | 10 | 1.39 |
| Ammonium diglycolate<br>Ammonium glycolate | ----do---- | 10<br>15 | 10 | 1.26 |
| Ammonium diglycolate<br>Ammonium glycolate | ----do---- | 10<br>20 | 10 | 1.42 |
| Ammonium diglycolate<br>Ammonium glycolate | ----do---- | 20<br>20 | 10 | 1.29 |

TABLE VIII.—COMPARISON OF GYPSUM SOLUBILITY IN DIGLYCOLIC ACID AND MALIC ACID SALTS

Type of test: Static
Test temperature: 75° F.
Test time: 8 hrs.

| Salt formed | Basic precursor used | Acid concentration, weight percent | pH of solution | Gypsum dissolved lbs./gal. |
|---|---|---|---|---|
| Ammonium diglycolate<br>Ammonium malate | Ammonium hydroxide | 10<br>10 | 10.0 | 0.990 |
| Ammonium diglycolate<br>Ammonium malate | ----do---- | 10<br>15 | 10.0 | 1.200 |
| Ammonium diglycolate<br>Ammonium malate | ----do---- | 10<br>20 | 10.0 | 1.435 |

TABLE IX.—SOLUBILITY OF VARIOUS TYPES OF SCALE IN DIGLYCOLIC ACID AND HYDROXY ACID SALT SOLUTIONS

Type of test: Static
Test temperature: 75° F.
Test time: 24 hrs.

| Salt formed | Basic precursor used | Acid concentration, weight percent | pH of solution | Lbs./gal. scale removed Gypsum | Lbs./gal. scale removed Calcium carbonate |
|---|---|---|---|---|---|
| Ammonium diglycolate | Ammonium hydroxide | 10 | 10 | 0.437 | 0.380 |
| Do | ----do---- | 20 | 10 | 1.130 | 0.720 |
| Do | ----do---- | 10<br>10 | 10 | 0.975 | .055 |
| Ammonium glycolate | | | | | |
| Ammonium diglycolate<br>Ammonium malate | ----do---- | 10<br>10 | 10 | 1.002 | 0.430 |
| Ammonium diglycolate<br>Ammonium E.D.T.A. | ----do---- | 10<br>10 | 10 | 0.834 | 0.291 |
| Do | ----do---- | 10 | 10 | 0.325 | 0.281 |

From the above it may be seen that the compositions of the present invention are operable when employed at temperatures over a range of 75° to 175° F. Thus, special heating or cooling of the compositions will not be required in removing scale deposits from equipment in the field under normal conditions. It may also be seen that the compositions of the present invention may be used for a single stage treatment for the removal of scale since little or nor insoluble precipitate is formed while the scale is being dissolved. Thus, no subsequent flushing or additional treatment is required.

The compositions of the present invention are preferably prepared by first preparing a solution containing an appropriate basic precursor of the desired salt, with the desired amounts of diglycolic acid or mixture of diglycolic acid and hydroxy acid then being added to form the desired salts. The pH of the resulting solution is adjusted by adding sufficient amounts of the basic precursor to arrive at the desired solution pH.

What is claimed is:

1. A composition for removing gypsum or anhydrite scales from surfaces without the formation of an insoluble deposit, which comprises:
   a. an aqueous solution of a salt of diglycolic acid and
   b. a base, selected from the group consisting of sodium hydroxide, potassium hydroxide, and ammonium hydroxide, said base being present in a concentration sufficient to adjust the pH of said solution to a pH of from about 6 to about 14.

2. The composition of claim 1 wherein said salt is present in a concentration of from about 1.5 percent to about 100 percent by weight of said solution.

3. The composition of claim 1 further characterized by the addition of a hydroxy acid which will react with said base to form the salt of the hydroxy acid, the hydroxy acid being selected from the group consisting of glycolic acid, malic acid and gluconic acid.

4. The composition of claim 3 wherein the hydroxy acid is present in a concentration of from about 0.5 percent to about 50 percent by weight of said solution.

5. The composition of claim 1 further characterized by the addition of a salt of a hydroxy acid, said acid being selected from the group consisting of glycolic acid, malic acid and gluconic acid.

6. The composition of claim 5 wherein said salt is present in a concentration of from about 1 percent to about 70 percent by weight of said solution.

7. The composition of claim 1 further characterized by the addition of a substituted amino acid which will react with said base to form a salt of said amino acid, the substituted amino acid being selected from the group consisting of ethylenediaminetetraacetic acid, diethylenetriaminepentaacetic acid and nitrilotriacetic acid.

8. The composition of claim 7 wherein said amino acid is present in a concentration of from about 0.5 percent to about 50 percent by weight of said solution.

9. The composition of claim 1 further characterized by the addition of the salt of a substituted amino acid, said acid being selected from the group consisting of ethylenediaminetetraacetic acid, diethylenetriaminepentaacetic acid and nitrilotriacetic acid.

10. The composition of claim 9 wherein the salt of said amino acid is present in a concentration of from about 1 percent to about 60 percent by weight of said solution.

11. A composition for removing gypsum or anhydrite scales from surfaces without the formation of an insoluble deposit, which comprises:
   a. an aqueous solution of diglycolic acid and
   b. a base, selected from the group consisting of sodium hydroxide, potassium hydroxide and ammonium hydroxide, said base being present in a concentration sufficient to form the salt of the diglycolic acid and to adjust the pH of said solution to a pH of from about 6 to about 14.

12. The composition of claim 11 wherein said acid is present in a concentration of from about 1 percent to about 70 percent by weight of said solution.

13. The composition of claim 11 further characterized by the addition of a hydroxy acid which will react with said base to form the salt of the hydroxy acid, the hydroxy acid being selected from the group consisting of glycolic acid, malic acid and gluconic acid.

14. The composition of claim 13 wherein the hydroxy acid is present in a concentration of from about 0.5 percent to about 50 percent by weight of said solution.

15. The composition of claim 11 further characterized by the addition of a salt of a hydroxy acid, said acid being selected from the group consisting of glycolic acid, malic acid and gluconic acid.

16. The composition of claim 15 wherein said salt is present in a concentration of from about 1 percent to about 70 percent by weight of said solution.

17. The composition of claim 11 further characterized by the addition of a substituted amino acid which will react with said base to form a salt of said amino acid, the substituted amino acid being selected from the group consisting of ethylenediaminetetraacetic acid, diethylenetriaminepentaacetic acid and nitrilotriacetic acid.

18. The composition of claim 17 wherein said amino acid is present in a concentration of from about 0.5 percent to about 50 percent by weight of said solution.

19. The composition of claim 11 further characterized by the addition of the salt of a substituted amino acid, said acid being selected from the group consisting of ethylenediaminetetraacetic acid, diethylenetriaminepentaacetic acid and nitrilotriacetic acid.

20. The composition of claim 19 wherein the salt of said amino acid is present in a concentration of from about 1 percent to about 60 percent by weight of said solution.

21. A method for removing gypsum or anhydrite scales from surfaces without the formation of an insoluble deposit, which comprises the step of:
contacting said scales with a composition which comprises;
   a. an aqueous solution of a salt of diglycolic acid and
   b. a base, selected from the group consisting of sodium hydroxide, potassium hydroxide and ammonium hydroxide, said base being present in a concentration sufficient to adjust the pH of said solution to a pH of from about 6 to about 14.

22. The method of claim 21 wherein said salt is present in a concentration of from about 1.5 percent to about 100 percent by weight of said solution.

23. The method of claim 21 further characterized by the addition of a hydroxy acid which will react with said base to form the salt of the hydroxy acid, the hydroxy acid being selected from the group consisting of glycolic acid, malic acid and gluconic acid.

24. The method of claim 23 wherein the hydroxy acid is present in a concentration of from about 0.5 percent to about 50 percent by weight of said solution.

25. The method of claim 21 further characterized by the addition of a salt of a hydroxy acid, said acid being selected from the group consisting of glycolic acid, malic acid and gluconic acid.

26. The method of claim 25 wherein the said salt is present in a concentration of from about 1 percent to about 70 percent by weight of said solution.

27. The method of claim 21 further characterized by the addition of a substituted amino acid which will react with said base to form a salt of said amino acid, the substituted amino acid being selected from the group consisting of ethylenediaminetetraacetic acid, diethylenetriaminepentaacetic acid and nitrilotriacetic acid.

28. The method of claim 27 wherein said amino acid is present in a concentration of from about 0.5 percent to about 50 percent by weight of said solution.

29. The method of claim 21 further characterized by the addition of the salt of a substituted amino acid, said acid being selected from the group consisting of ethylenediaminetetraacetic acid, diethylenetriaminepentaacetic acid and nitrilotriacetic acid.

30. The method of claim 29 wherein the salt of said amino acid is present in a concentration of from about 1 percent to about 60 percent by weight of said solution.

31. A method for removing gypsum or anhydrite scales from surfaces without the formation of an insoluble deposit, which comprises the step of:
contacting said scales with a composition which comprises;
   a. an aqueous solution of diglycolic acid and
   b. a base, selected from the group consisting of sodium hydroxide, potassium hydroxide and ammonium hydroxide, said base being present in a concentration sufficient to form the salt of the diglycolic acid and to adjust the pH of said solution of a pH of from about 6 to about 14.

32. The method of claim 31 wherein said acid is present in a concentration of from about 1 percent to about 70 percent by weight of said solution.

33. The method of claim 31 further characterized by the addition of a hydroxy acid which will react with said base to form the salt of the hydroxy acid, the hydroxy acid being selected from the group consisting of glycolic acid, malic acid and gluconic acid.

34. The method of claim 33 wherein the hydroxy acid is present in a concentration of from about 0.5 percent to about 50 percent by weight of said solution.

35. The method of claim 31 further characterized by the addition of a salt of a hydroxy acid, said acid being selected from the group consisting of glycolic acid, malic acid and gluconic acid.

36. The method of claim 35 wherein said salt is present in a concentration of from about 1 percent to about 70 percent by weight of said solution.

37. The method of claim 31 further characterized by the addition of a substituted amino acid which will react with said base to form a salt of said amino acid, the substituted amino acid being selected from the group consisting of ethylenediaminetetraacetic acid, diethylenetriaminepentaacetic acid and nitrilotriacetic acid.

38. The method of claim 37 wherein said amino acid is present in a concentration of from about 0.5 percent to about 50 percent by weight of said solution.

39. The method of claim 31 further characterized by the addition of the salt of a substituted amino acid, said acid being selected from the group consisting of ethylenediaminetetraacetic acid, diethylenetriaminepentaacetic acid and nitrilotriacetic acid.

40. The method of claim 39 wherein the salt of said amino acid is present in a concentration of from about 1 percent to about 60 percent by weight of said solution.

* * * * *